(12) United States Patent
Su et al.

(10) Patent No.: US 8,376,764 B1
(45) Date of Patent: Feb. 19, 2013

(54) CARD CONNECTOR

(75) Inventors: Yu-Hung Su, New Taipei (TW);
Yao-Ting Wang, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 71 days.

(21) Appl. No.: 13/214,199

(22) Filed: Aug. 21, 2011

(51) Int. Cl.
*H01R 13/62* (2006.01)
(52) U.S. Cl. .......................... 439/157; 439/630
(58) Field of Classification Search .................. 439/152, 439/157, 159, 630, 607.31
See application file for complete search history.

(56) References Cited

U.S. PATENT DOCUMENTS

| | | | | |
|---|---|---|---|---|
| 7,048,588 B2 * | 5/2006 | Chang | | 439/630 |
| 7,780,464 B2 * | 8/2010 | Li et al. | | 439/327 |
| 8,043,121 B2 * | 10/2011 | Matsunaga | | 439/629 |
| 8,113,886 B2 * | 2/2012 | Jung et al. | | 439/630 |

* cited by examiner

*Primary Examiner* — Hien Vu
(74) *Attorney, Agent, or Firm* — Cheng-Ju Chiang

(57) ABSTRACT

A card connector is disclosed. The card connector comprises an insulative base, a plurality of connecting terminals, a card ejecting mechanism and a shielding case. The shielding case covers the insulative base. A card insertion region is formed between the insulative base and the shielding case. A plurality of terminal slots is defined on a surface of the insulative base facing the card insertion region. The connecting terminals are received in the terminal slots. The tray comprises an inner tray and an outer tray. The outer tray is pivotally connected to the inner tray. The inner tray and the outer tray are connected together to form a receiving groove for receiving a SIM card. The tray is formed by pivotally connecting the inner tray to the outer tray, therefore, the card connector according to the present invention can be used more conveniently.

3 Claims, 4 Drawing Sheets

CARD CONNECTOR

BACKGROUND OF THE INVENTION

1. Field of the Invention

The present invention generally relates to an electronic card connector, and more particularly to a tray-type card connector.

2. Description of Prior Art

With technological advancement, mobile phones have become indispensible in modern life. To implement functions of a mobile phone, a subscriber identity model (SIM, also called to subscriber identity module) card is required in a general mobile phone system. The SIM card has a plurality of contact pads for electrically connecting to terminals of a SIM card connector of the mobile phone, so as to implement the functions of communicating and storing information.

The SIM card is directly inserted into a SIM card slot in a traditional mobile phone. For the purpose of user's convenience, a tray-type SIM card connector is developed in the market. The tray-type SIM card connector can be put in a tray to be inserted into the SIM card slot.

However, the above-mentioned tray is integrated as one-piece with the SIM card connector, and thus the tray being conveniently used is still required to be improved.

SUMMARY OF THE INVENTION

To solve the above-mentioned deficiencies in the prior art, an objective of the present invention is to provide a tray-type card connector which can be used conveniently.

To implement the above-mentioned object, the card connector according to an aspect of the present invention comprises an insulative base, a plurality of connecting terminals, a card ejecting mechanism and a shielding case. The shielding case covers the insulative base. A card insertion region is formed between the insulative base and the shielding case. A plurality of terminal slots is defined on a surface of the insulative base facing the card insertion region. The connecting terminals are received in the terminal slots. The tray comprises an inner tray and an outer tray. The outer tray is pivotally connected to the inner tray. The inner tray and the outer tray are connected together to form a receiving groove for receiving a SIM card. Plural tray terminal slots are defined on the receiving groove for communicating with the corresponding terminal slots. Each of the connecting terminals has an elastic contact part. The elastic contact part is protruded through the corresponding tray terminal slot via the corresponding terminal slot.

As mentioned above, the tray is formed by pivotally connecting the inner tray to the outer tray, therefore, the card connector according to the present invention can be more conveniently used than a traditional card connector.

DETAILED DESCRIPTION OF THE INVENTION

Figure 1:
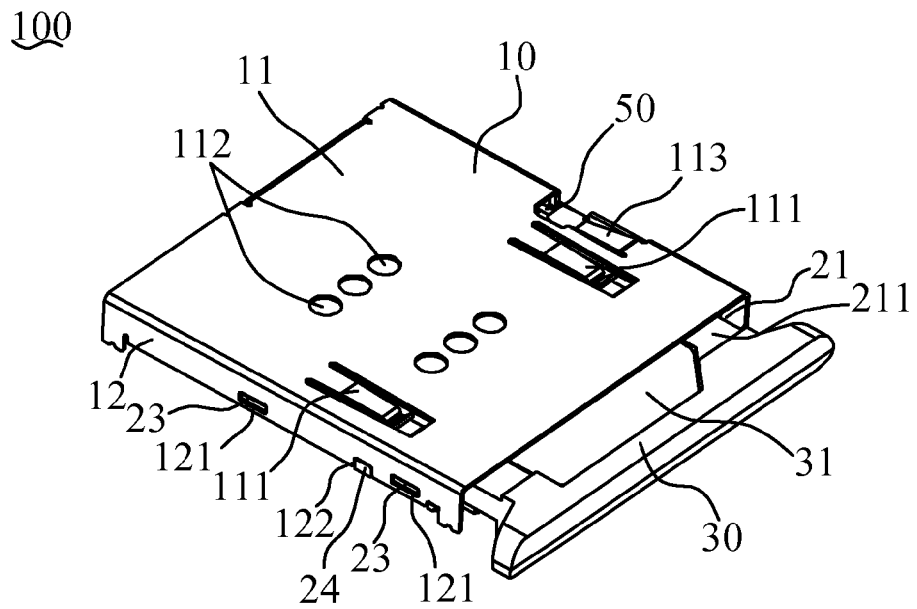
FIG. 1 is a perspective view of a card connector in accordance with the present invention.
Figure 2:
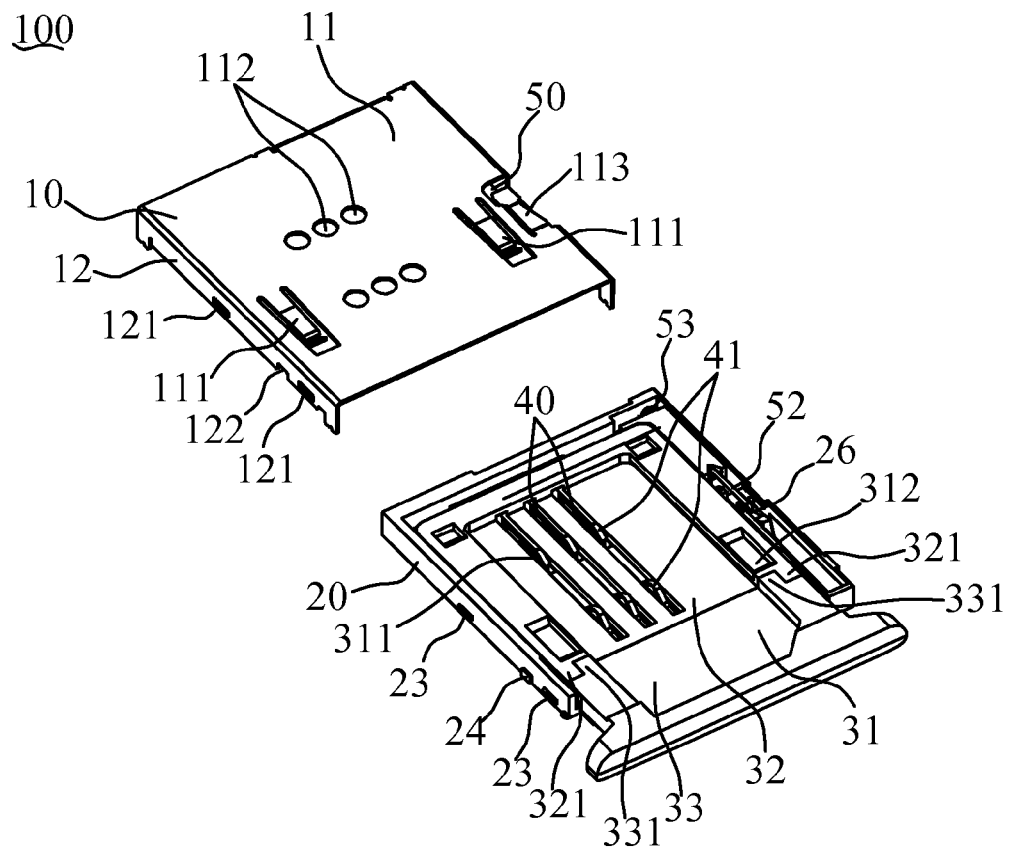
FIG. 2 is an exploded view of the card connector in accordance with the present invention.
Figure 5:
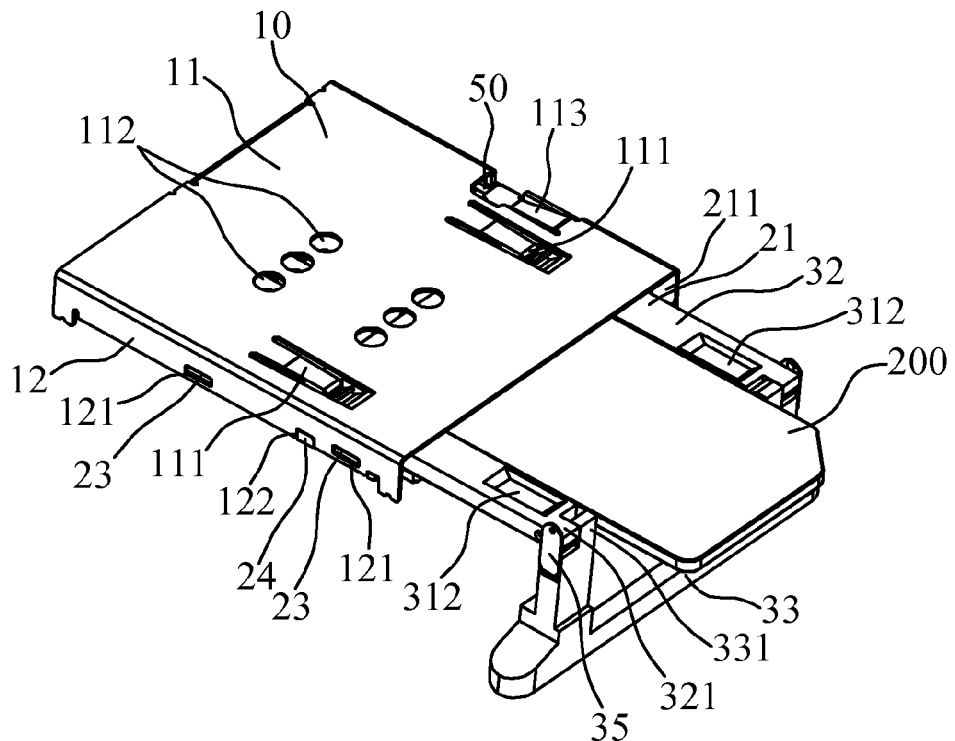
FIG. 5 illustrates a structure diagram in a state where a SIM card is assembled to the card connector according to the present invention.

Please refer to FIGS. 1 and 2, a card connector 100 for containing a SIM card 200 (as shown in FIG. 5) according to the present invention comprises a shielding case 10, an insulative base 20, a tray 30, a plurality of connecting terminals 40 and a card ejecting mechanism 50.

Figure 3:
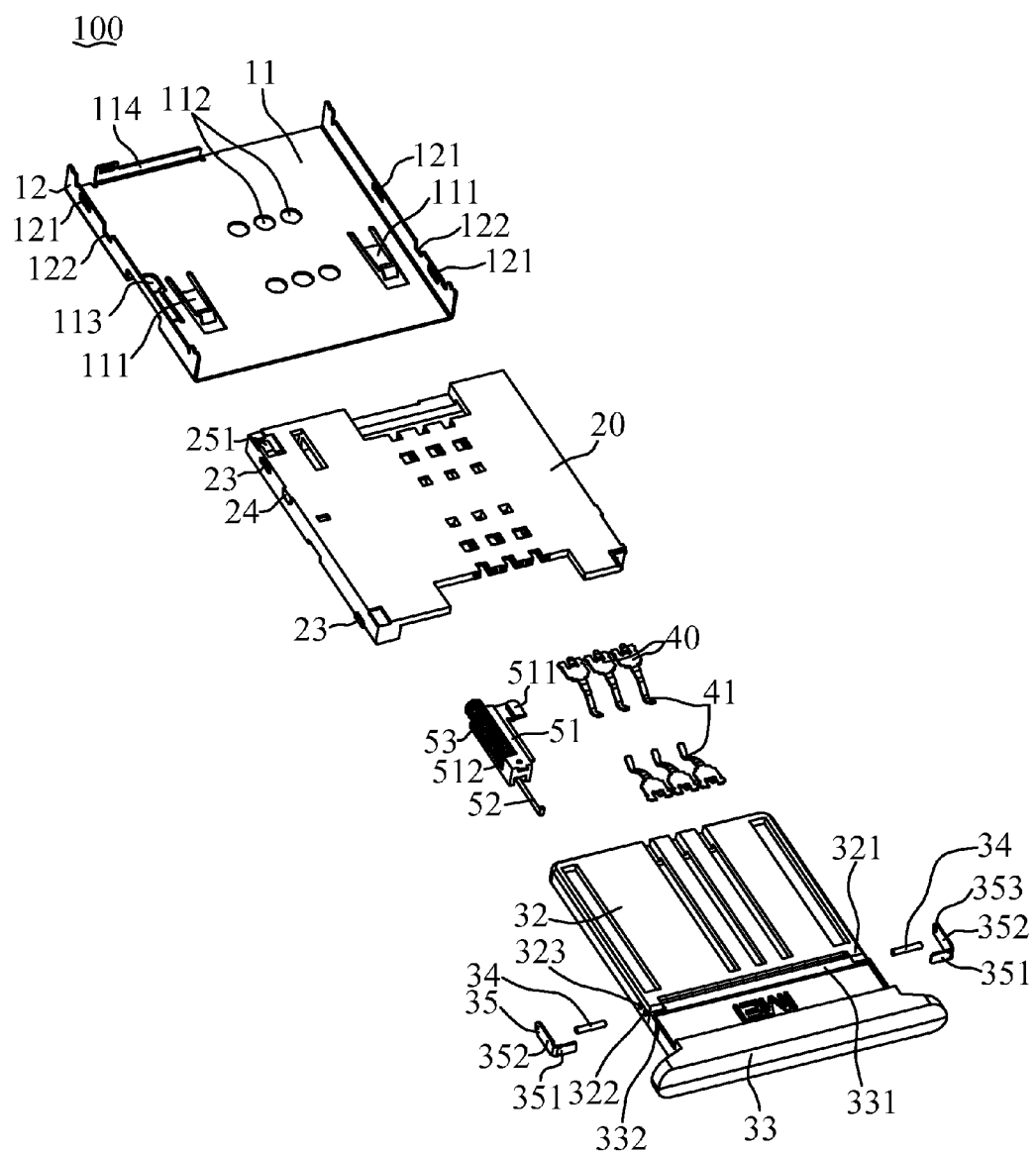
FIG. 3 is a perspective view of the card connector from one angle in accordance with the present invention.

Referring to FIGS. 2 and 3, the shielding case 10 comprises a shielding body 11 and two side arms 12 integrated and connected with the shielding body 11. Two sheets 111 are downwardly protruded from two sides of the shielding body 11. A plurality of process holes 112 are machined between the sheets 111 on the shielding body 11. An elastic stopping sheet 113 is protruded downwardly at an outer side of one of the sheets 111. A limiting block 114 is extended downwardly from a rear end of the shielding base 11 for preventing the SIM card 200 from being inserted over the rear end of the shielding base 11. First locking holes 121 and notches 122 are formed at the two side arms 12 of the shielding case 10. The shielding case 10 covers the insulative base 20.

Referring to FIGS. 1-4, a card insertion region 21 is formed between the insulative base 20 and the shielding case 10. The card insertion region 21 has an opening 211 in a forward facing direction. A plurality of terminal slots 22 are defined on a surface of the insulative base 20 facing the card insertion region 21. Locking blocks 23 and protrusions 24 are disposed at two side walls of the insulative base 20. The locking blocks 23 are inserted into the corresponding first locking holes 121. The protrusions 24 are received in the corresponding notches 122. A slide groove 25 is defined at one side of the surface of the insulative base 20 corresponding to the elastic stopping sheet 113. A first post 251 is disposed at a rear end of the slide groove 251. The insulative base 20 further comprises a heart-shaped slot 26 defined at a front end of the slide groove 25.

Referring to FIGS. 1-4, the tray 30 defines a receiving groove 31 therein for receiving the SIM card. A plurality of tray terminal slots 311 is defined on the receiving slot 31. Each of the tray terminal slots 311 communicates with a corresponding terminal slot 22. Locking slots 312 are defined at two sides of the receiving groove 31 of the tray 30. When the tray 30 is inserted into the card insertion region 21, the sheets 111 are retained in the locking slots 312.

Figure 4:
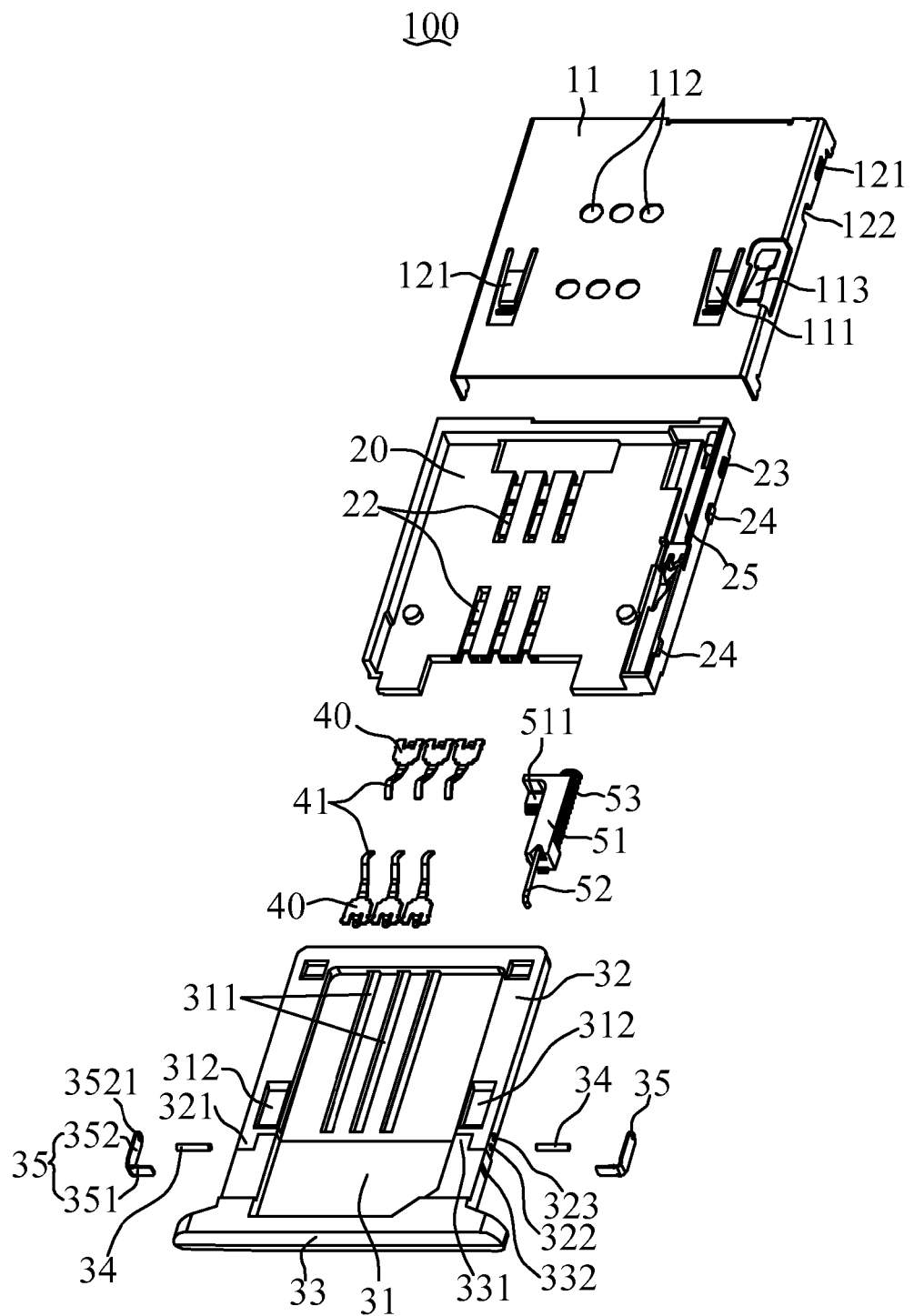
FIG. 4 is a perspective view of the card connector from another angle in accordance with the present invention.

Referring to FIGS. 3 and 4, the tray 30 preferably comprises an inner tray 32, an outer tray 33, rotary shafts 34 and rotary shaft fixing members 35. First rotary connecting members 321 are disposed at a front end of the inner tray 32. First shaft holes 322 are defined at two side walls of the first rotary connecting members 321. Second locking holes 323 are defined at two side walls of the inner tray 32 and adjacent to the first shaft holes 322. Second rotary connecting members 331 are disposed at a rear end of the outer tray 33. Second shaft holes (not shown) are defined at two side walls of the second rotary connecting members 331. Fixing holes 332 are defined at two side walls of the outer tray 33 and in front of the second shaft holes. The outer tray 33 is pivotally connected to the front end of the inner tray 32. Specifically, the second rotary connecting members 331 are embedded in the first rotary connecting members 321. The rotary shafts 34 are pivotally inserted into the first shaft holes 322 and the second shaft holes, so that the outer tray 33 can be pivotally connected to the inner tray 32. The receiving groove 31 is formed when the inner tray 32 and the outer tray 33 are connected together. Each of the rotary shaft fixing members 35 comprises an insertion part 351 and a resisting part 352. The insertion part 351 and the resisting part 352 are integral as one-piece and form a bent shape. The insertion part 351 is inserted into the corresponding fixing holes 332. The resisting part 352 leans against one end of the corresponding rotary shaft 34 for preventing the rotary shaft 34 from being loosed. Second protrusions 353 being semi-ball shaped are disposed on an inner side wall of an outer end of the resisting parts 352. The second protrusions 353 are retained in the second locking holes 323.

Referring to FIG. 4, the connecting terminals 40 are received in the corresponding terminal slots 22. Each of the connecting terminals 40 has an elastic contacting part 41 being protruded through the corresponding tray terminal slot 311 via the corresponding terminal slot 22.

Referring to FIGS. 3 and 4, the card ejecting mechanism 50 comprises a slide block 51, a guide member 52 and an elastic member 53. A card ejecting arm 511 is extended from a rear end of the slide block 51 to the card inserting region 21 for ejecting the SIM card. A front end of the slide block 51 is connected to the guide member 52. The slide block 51 can slide freely in the slide groove 25. The slide block 51 comprises a second protrusion post 251 corresponding to the first protrusion post 251. Two ends of the elastic member 53 are respectively circled on the first protrusion post 251 and the second protrusion post 252. The guide member 52 can slide freely in the heart-shape slot 26.

Figure 6:
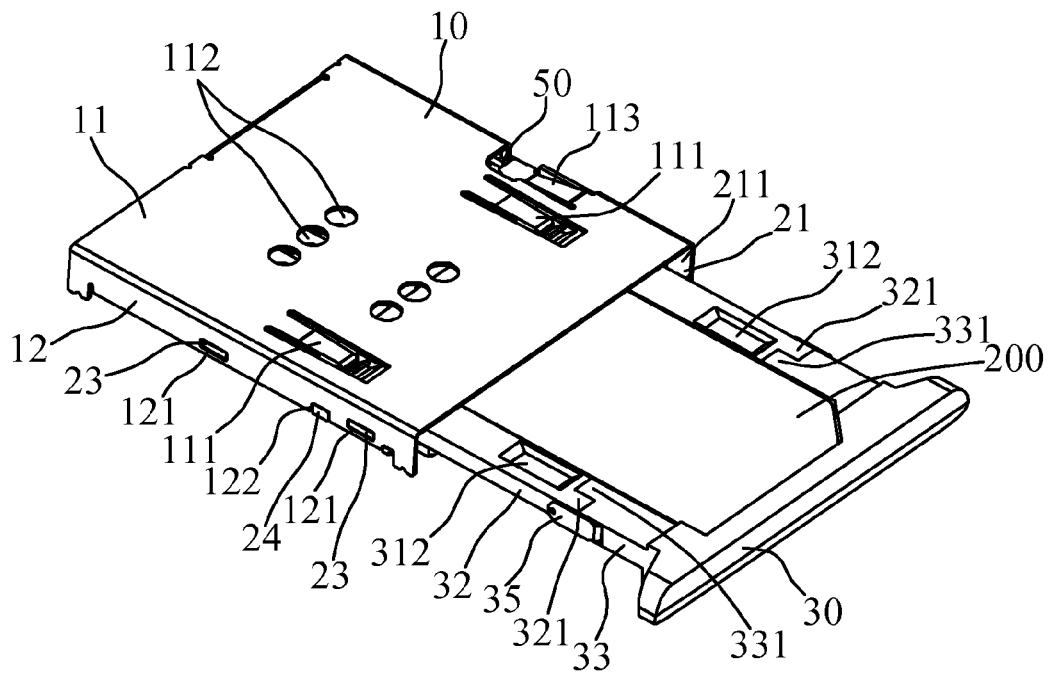
FIG. 6 illustrates a structure diagram in another state where a SIM card is assembled to the card connector according to the present invention.

Referring to FIGS. 5 and 6, when the SIM card 200 is assembled with the card connector 100 of the present invention, the tray 30 is pulled firstly. The outer tray 33 is pulled down, and the second protrusions 353 are loosed from the second locking holes 323, so that the outer tray 33 pivots downwardly. Then, the SIM card 200 is put in the receiving groove 31 on the inner tray 32. The outer tray 33 pivots upwardly until the outer tray 33 and the inner tray 32 are horizontally connected together. In the meantime, the second protrusions 353 are received in the corresponding second locking holes 323 to implement the connection between inner tray 32 and the outer tray 33. The tray 30 is pushed inwardly, and the rear end 30 of the tray 30 leans against the card ejecting arm 511 of the card ejecting mechanism 50, so that the card ejecting arm 511 forces the slide block 51 to slide backwardly and the elastic member 53 is compressed to store elastic energy. The guide member 52 slides in the heart-shaped slot 26 until the slide block 51 is locked at a latch position. The elastic stopping sheet 113 leans against the guide member 52 for preventing the guide member 52 from popping out. The sheets 111 are fixed in the locking slots 312, and the assembling of the SIM card 200 is achieved. The disassembled processes of the SIM card 200 are opposed to the above-mentioned assembled processes of the SIM card 200 and not described in detail herein.

The tray 30 is formed by pivotally connecting the inner tray 32 to the outer tray 33, and therefore the card connector 100 according to the present invention can be used more conveniently than the traditional card connector.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A card connector, comprising an insulative base, a plurality of connecting terminals, a card ejecting mechanism and a shielding case, the shielding case covering the insulative base, a card insertion region being formed between the insulative base and the shielding case, a plurality of terminal slots being defined on a surface of the insulative base facing the card insertion region, the connecting terminals being received in the terminal slots, wherein the card connector further comprises a tray comprising an inner tray and an outer tray, the outer tray is pivotally connected to the inner tray by at least one rotary shaft, whereby the inner tray and the outer tray are connected together to form a receiving groove for receiving a card, wherein plural tray terminal slots are defined on the receiving groove for communicating with the corresponding terminal slots, each of the connecting terminals has an elastic contact part which is protruded through the corresponding tray terminal slot via the corresponding terminal slot; and wherein at least one locking block and at least one protrusion are disposed at each of two side walls of the insulative base, at least one first locking hole and at least one notch are formed at each of two sides of the shielding case, the locking block is inserted into the first locking hole, the protrusion is received in the notch, at least one locking slot is defined at each of two sides of the receiving groove of the tray, sheets are downwardly protruded from an upper portion of two sides of the shielding case, and the sheets are retained in the corresponding locking slots when the tray is inserted into the card insertion region.

2. The card connector as claimed in claim 1, further comprising a card ejecting mechanism, wherein the card ejecting mechanism comprises a slide block, a guide member and an elastic member, wherein a card ejecting arm is extended from an end of the slide block to the card inserting region for ejecting the card, the other end of the slide block is connected to the guide member, a slide groove is defined on the insulative base, the slide block freely slides in the slide groove, posts are respectively disposed on the insulative base and the slide block, the elastic member is circled on the two posts, a heart-shaped slot is defined on one side wall of the insulative base for retaining the guide member, and the guide member freely slides in the heart-shaped slot.

3. The card connector as claimed in claim 1, wherein the tray further comprises at least one rotary shaft fixing member, a first rotary connecting member is disposed at a front end of the inner tray, at least one first shaft hole is defined at each of two side walls of the first rotary connecting members, at least one second locking hole is defined at each of two side walls of the inner tray and adjacent to the corresponding first shaft hole, a second rotary connecting member is disposed at a rear end of the outer tray, at least one second shaft hole is defined at each of two side walls of the second rotary connecting members, at least one fixing hole is defined at each of two side walls of the outer tray and in front of the second shaft hole, the second rotary connecting member is embedded in the first rotary connecting member, the rotary shaft is pivotally inserted into the first shaft hole and the second shaft hole, so that the outer tray is pivotally connected to the inner tray, the rotary shaft fixing member comprises an insertion part and a resisting part, the insertion part and the resisting part are integral as one-piece and form a bent shape, the insertion part is inserted into the fixing hole, the resisting part leans against one end of the rotary shaft, second protrusion being semi-ball shaped is disposed on an inner side wall of an outer end of the resisting parts, and the second protrusion is retained in the second locking hole.

* * * * *